United States Patent
Meyer et al.

(10) Patent No.: US 7,046,471 B2
(45) Date of Patent: May 16, 2006

(54) METHOD AND APPARATUS FOR UTILIZING VARIABLE TRACKS PER INCH TO REDUCE BITS PER INCH FOR A HEAD

(75) Inventors: Forrest C. Meyer, Eden Prairie, MN (US); Tong Shi, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/335,801

(22) Filed: Jan. 2, 2003

(65) Prior Publication Data
US 2004/0021975 A1    Feb. 5, 2004

Related U.S. Application Data

(60) Provisional application No. 60/400,524, filed on Jul. 31, 2002.

(51) Int. Cl.
G11B 21/02    (2006.01)
(52) U.S. Cl. .......................................... 360/75
(58) Field of Classification Search ............... 360/75, 360/31, 48, 51, 60, 78.05, 78.08, 121, 69
See application file for complete search history.

(56) References Cited

U.S. PATENT DOCUMENTS

| | | | | |
|---|---|---|---|---|
| 4,933,795 A * | 6/1990 | Nigam | ....................... | 360/121 |
| 4,945,427 A | 7/1990 | Cunningham | ................ | 360/75 |
| 5,537,277 A * | 7/1996 | Kato | ........................... | 360/121 |
| 5,596,458 A | 1/1997 | Emo et al. | .................... | 360/48 |
| 5,870,237 A | 2/1999 | Emo et al. | .................... | 360/48 |
| 5,999,351 A | 12/1999 | Albrecht et al. | .............. | 360/48 |
| 5,999,352 A * | 12/1999 | Teck et al. | .................... | 360/48 |
| 6,061,195 A | 5/2000 | Wilson et al. | ................ | 360/48 |
| 6,075,665 A | 6/2000 | Chainer et al. | ............... | 360/48 |
| 6,091,559 A | 7/2000 | Emo et al. | .................... | 360/48 |
| 6,130,796 A * | 10/2000 | Wiselogel | .................... | 360/75 |
| 6,137,644 A | 10/2000 | Hetzler et al. | ................ | 360/48 |
| 6,493,176 B1 * | 12/2002 | Deng et al. | ............. | 360/78.05 |
| 6,611,395 B1 * | 8/2003 | Chainer et al. | ............... | 360/75 |
| 6,714,372 B1 * | 3/2004 | Codilian et al. | ............. | 360/60 |
| 2002/0036849 A1 | 3/2002 | Quak et al. | | |

FOREIGN PATENT DOCUMENTS

| | | |
|---|---|---|
| EP | 0 347 102 B1 | 6/1994 |
| WO | WO 00/01146 | 1/2000 |

OTHER PUBLICATIONS

U.S. Appl. No. 09/885,302, filed Jun. 20, 2001, Ding et al.

* cited by examiner

*Primary Examiner*—William Klimowicz
*Assistant Examiner*—Fred F. Tzeng
(74) *Attorney, Agent, or Firm*—Theodore M. Magee; Westman, Champlin & Kelly, P.A.

(57) ABSTRACT

A method and disc drive in which tracks and data rates are designated is provided. Under the invention, the write width of a transducer head is determined. A tracks per inch value is adjusted based on the write width, and a data transfer rate is adjusted based on the adjusted tracks per inch value. In particular, the data transfer rate is adjusted such that the adjusted tracks per inch value and the adjusted data transfer rate provide a capacity for the head that is equal to a nominal capacity.

10 Claims, 7 Drawing Sheets

METHOD AND APPARATUS FOR UTILIZING VARIABLE TRACKS PER INCH TO REDUCE BITS PER INCH FOR A HEAD

CROSS-REFERENCE TO RELATED APPLICATION

This application claims priority from U.S. Provisional Application 60/400,524 filed on Jul. 31, 2002 for inventors Forrest C. Meyer and Tong Shi and entitled VARIABLE TPI.

FIELD OF THE INVENTION

The present invention relates generally to data storage systems, and more particularly to methods for designating tracks and data rates within data storage systems.

BACKGROUND OF THE INVENTION

A typical disc drive includes one or more discs having data surfaces for storage of digital information in a plurality of circular, concentric data tracks. The discs are mounted on a spindle motor that causes the discs to spin and the data surfaces of the discs to pass under transducers, which write information to and read information from the data surfaces of the discs.

Areal density is a measure of data bits per unit of surface area of the medium. The areal density is a function of the number of tracks-per-inch (TPI) along the radius of the disc and the number of bits-per-inch (BPI) along the tracks. The bits-per-inch value for a particular track is a function of the data transfer rate, the data encoding rate, the radial position of the track, and the angular speed of the medium. In most disc drives, the TPI and BPI for the disc drive are set based on a desired storage capacity for the drive and the nominal performance characteristics of the transducers. Under some prior art disc drives, different radial zones on the drive were assigned different TPI values to take advantage of different performance characteristics of the transducer at different radial positions along the disc.

Once the TPI and BPI values are designated for a drive, the manufacturer of the transducers attempts to build transducers that can meet the designated TPI and BPI values. Due to variations in the manufacturing process, some of the transducing heads have less than ideal geometry properties, unfit for the TPI requirements. Geometry problems are a major factor impacting transducers' write and read performance.

In the past, heads that could not satisfy the TPI or BPI requirement were discarded. Recently, attempts have been made to overcome the shortcomings of some heads by increasing the storage capacity associated with other heads in the drive to compensate for the lost storage capacity of the under-performing heads. However, this requires the TPI and/or BPI of a number of heads to be changed simply because one head has not met specifications. This is less than desirable. Thus, a system is needed that will result in fewer transducing heads being discarded but at the same time will require as few changes as possible to the capacity design point of the disc drive.

Embodiments of the present invention address these and other problems, and offer other advantages over the prior art.

SUMMARY OF THE INVENTION

A method and disc drive in which tracks and data rates are designated is provided. Under the invention, the write width of a transducer head is determined. A tracks per inch value is adjusted based on the write width, and a data transfer rate is adjusted based on the adjusted tracks per inch value. In particular, the data transfer rate is adjusted such that the adjusted tracks per inch value and the data transfer rate provide a capacity for the head that is equal to a nominal capacity.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
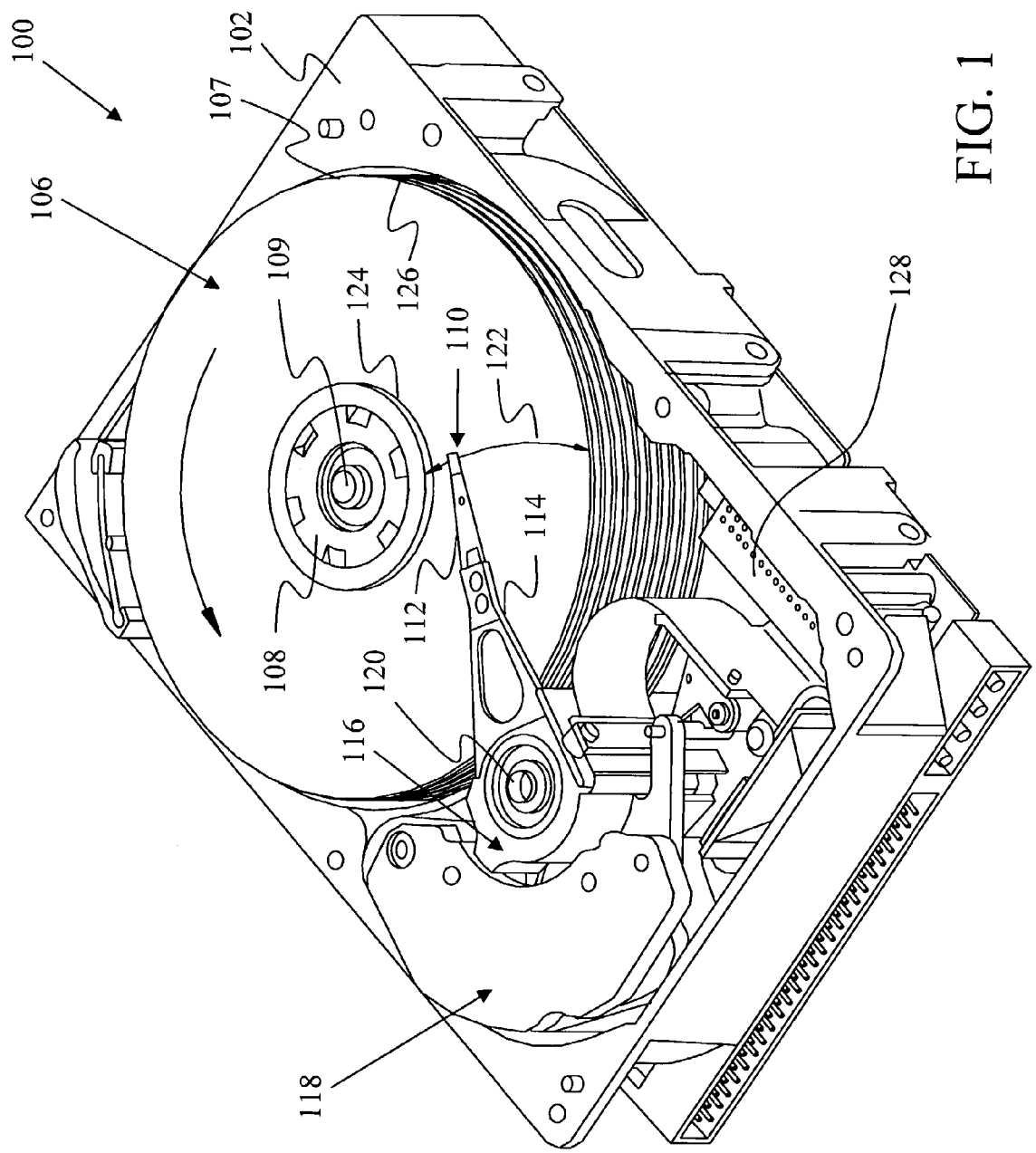
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates pivot housing 116 with its attached heads 110 about a pivot shaft 120 to position heads 110 over a desired data track along an arcuate path 122 between a disc inner diameter 124 and a disc outer diameter 126. Voice coil motor 118 is driven by servo electronics, also known as controller, 128 based on signals generated by heads 110 and a host computer (not shown).

Figure 2:
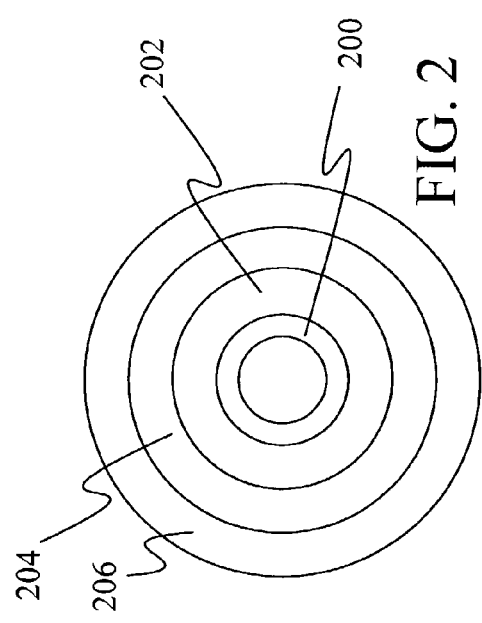
FIG. 2 is a top view of a disc surface showing radial zones.

In many embodiments, the disc is divided into radial recording zones as shown in FIG. 2. Under such embodiments, each zone 200, 202, 204, and 206 has its own nominal capacity and nominal bits per inch value. The entire drive typically shares the same nominal tracks per inch value, which is set based on the expected write width of the head.

The expected write width of the head is set based on a desired capacity for the drive and the performance specifications of the transducers used in the drive. Ideally, all heads that were manufactured for a line of drives would have the same write width as the expected write width. However, due to variations in the manufacturing process, the write widths of the heads vary as shown in FIG. 3.

Figure 3:
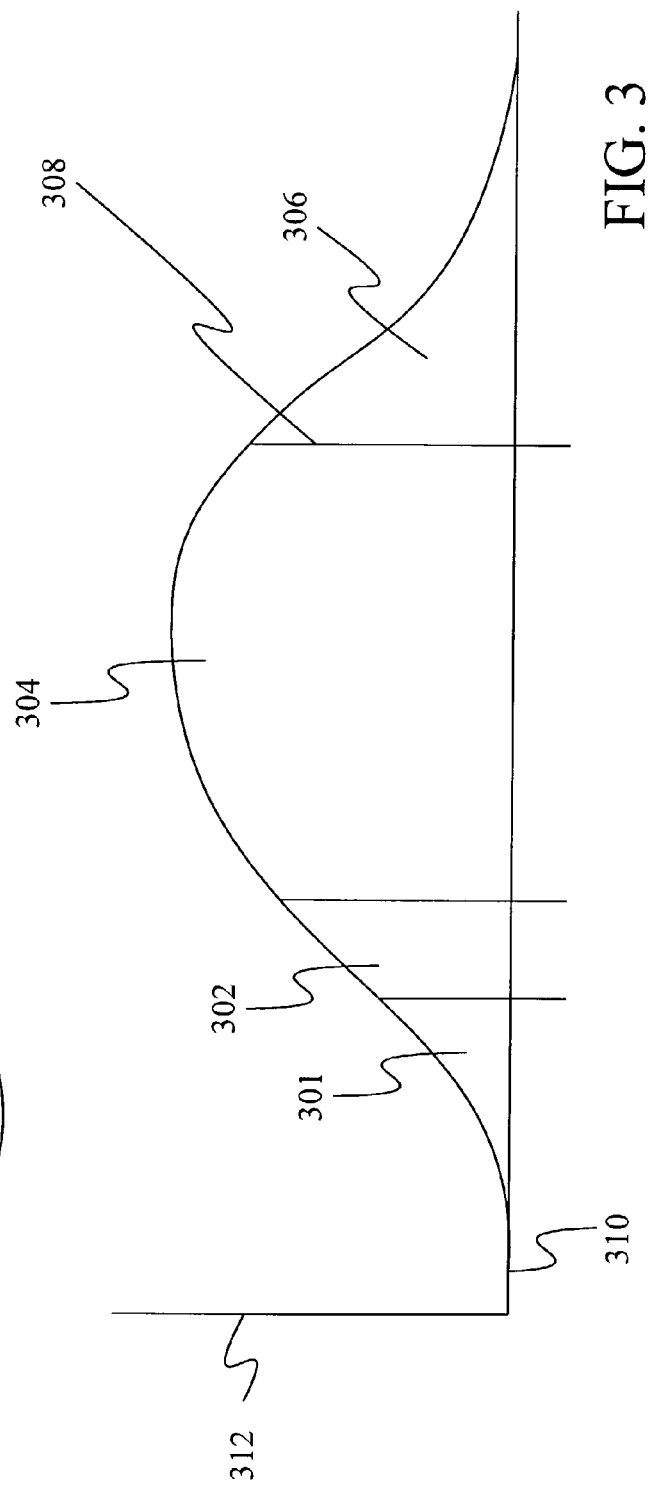
FIG. 3 is a graph showing the distribution of manufactured head widths.

In FIG. 3, the widths of the heads are shown along horizontal axis 310 and the number of heads at each width is shown along vertical axis 312. As can be seen in FIG. 3, the heads have a distribution 300 that can be divided into four regions 301, 302, 304 and 306. Heads in regions 301 and 302 are scrapped under the prior art because they fail to meet the signal-to-noise ratio for the drive at the nominal BPI. Heads in region 304 provide a large enough signal-to-noise ratio at the nominal BPI and are able to write tracks at the nominal TPI. Heads that fall in region 304 are used to build disc drives under the prior art. Heads in region 306, although typically able to provide good signal-to-noise ratio, are wide enough to be prone to encroaching data on neighboring tracks. They are also scrapped under the prior art.

The present invention permits far more of the heads in FIG. 3 to be used in the manufacture of disc drives. In particular, heads in region 302 do not have to be scrapped under the present invention because the present invention provides a method that allows the data transfer rates of these heads to be reduced while maintaining the same capacity for the head. By reducing the data transfer rates of these heads, the signal-to-noise performance of the heads can be improved, thereby making it possible for more heads to pass testing. In other embodiments, some heads in region 306 may be used in disc drives by reducing the TPI for that head, thereby increasing the allowable width for the head.

The present invention is able to reduce the data transfer rates of various heads by reclaiming guard band space that is otherwise wasted for narrower heads. This wasted space can be seen by comparing FIGS. 4 and 5.

Figure 4:
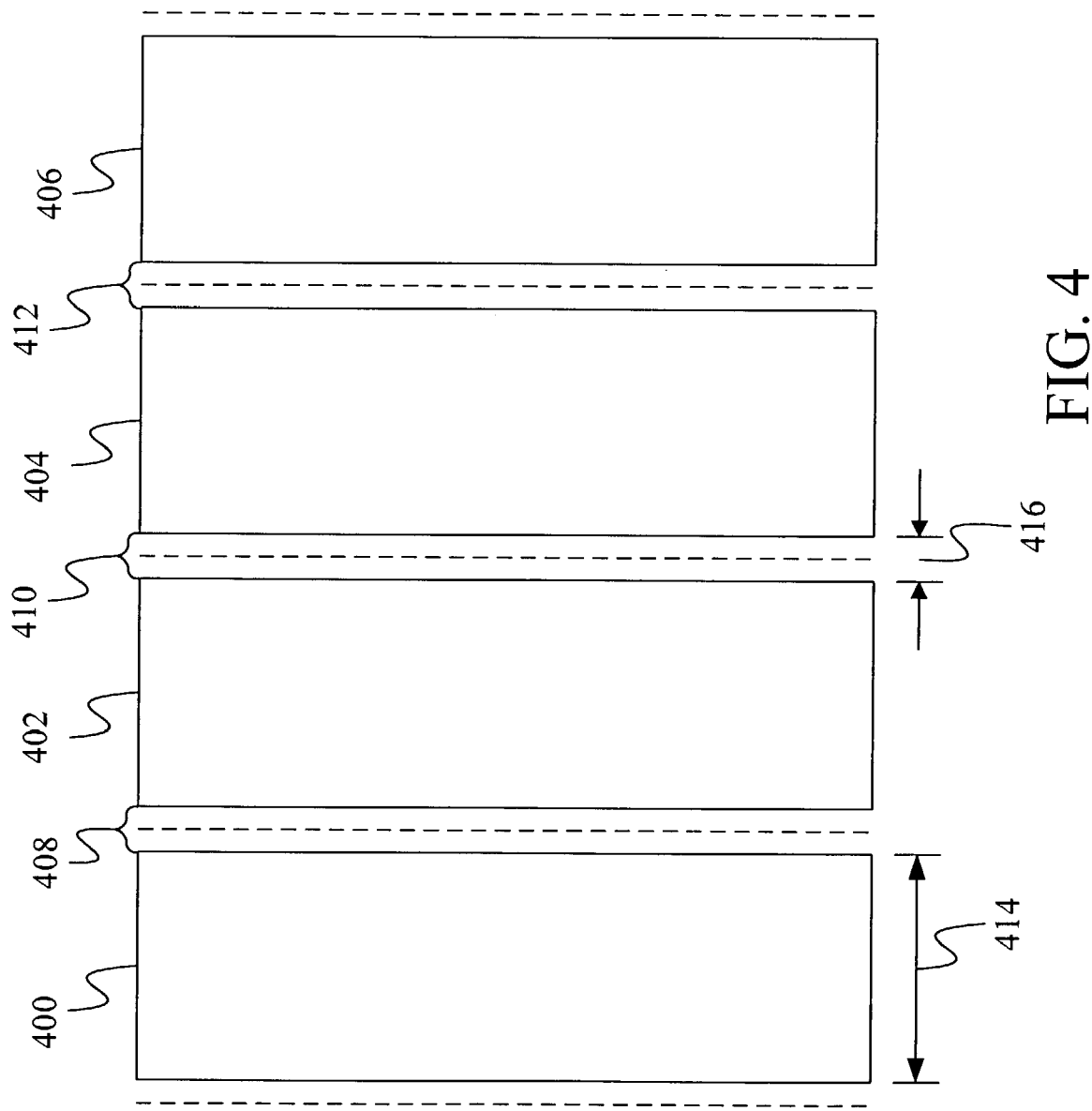
FIG. 4 is a diagram of nominal tracks with guard bands.
Figure 5:
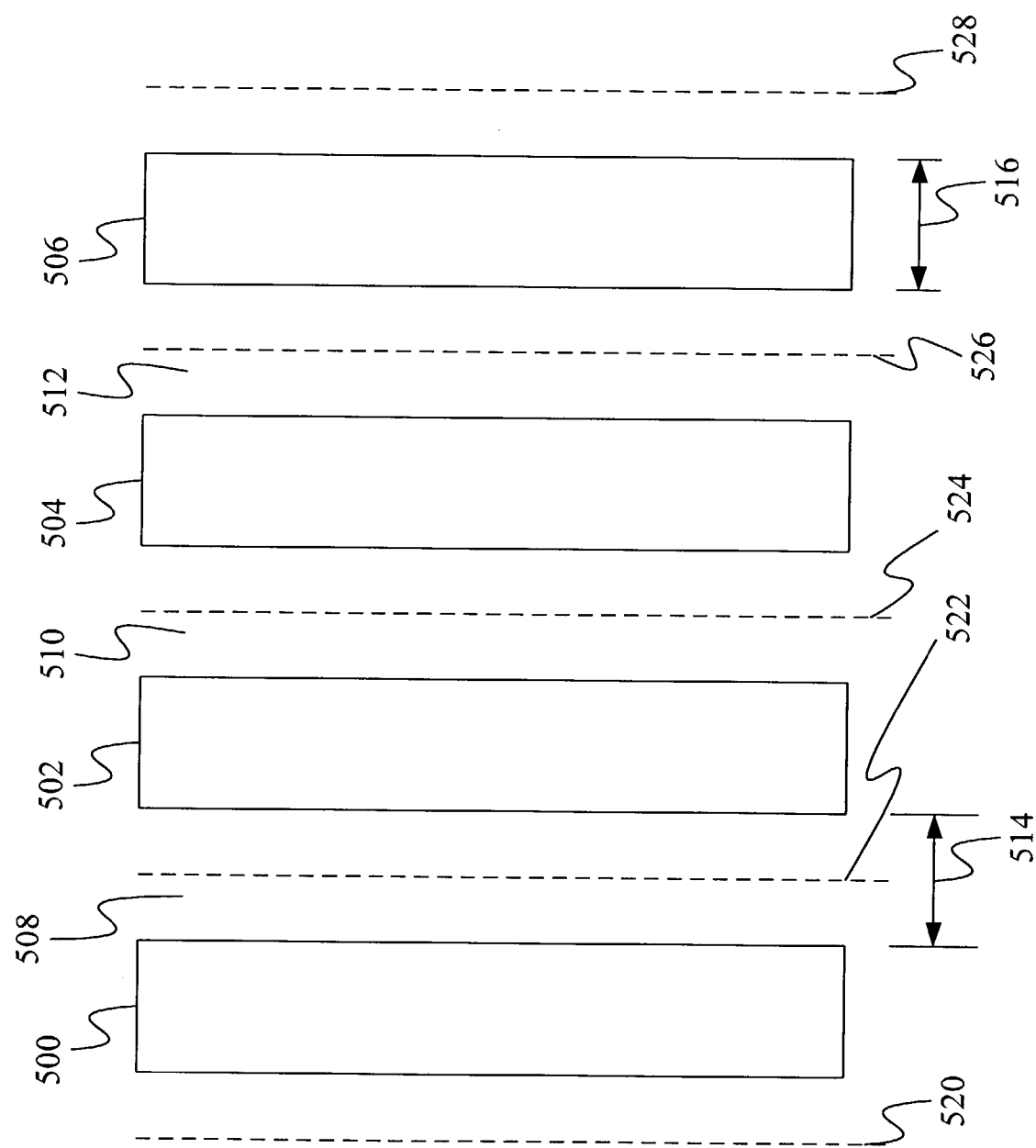
FIG. 5 is a diagram of an actual track with larger than nominal guard bands.

FIG. 4 is a diagram showing four nominal tracks 400, 402, 404 and 406 having guard bands 408, 410 and 412. Each track has a nominal width 414 and each guard band has a nominal width 416 designed to prevent adjacent track overwrite. FIG. 5 is a diagram showing four actual tracks 500, 502, 504 and 506 written by a head that has a smaller than nominal width. As can be seen in FIG. 5, the narrower width 516 of the head results in larger width 514 for the guard bands 508, 510 and 512.

The present invention reclaims some of the area in the wider guard bands by redefining the track width on a per head and per zone basis. The reclaimed area is then utilized to reduce the data transfer rate set for that head and zone.

Figure 6:
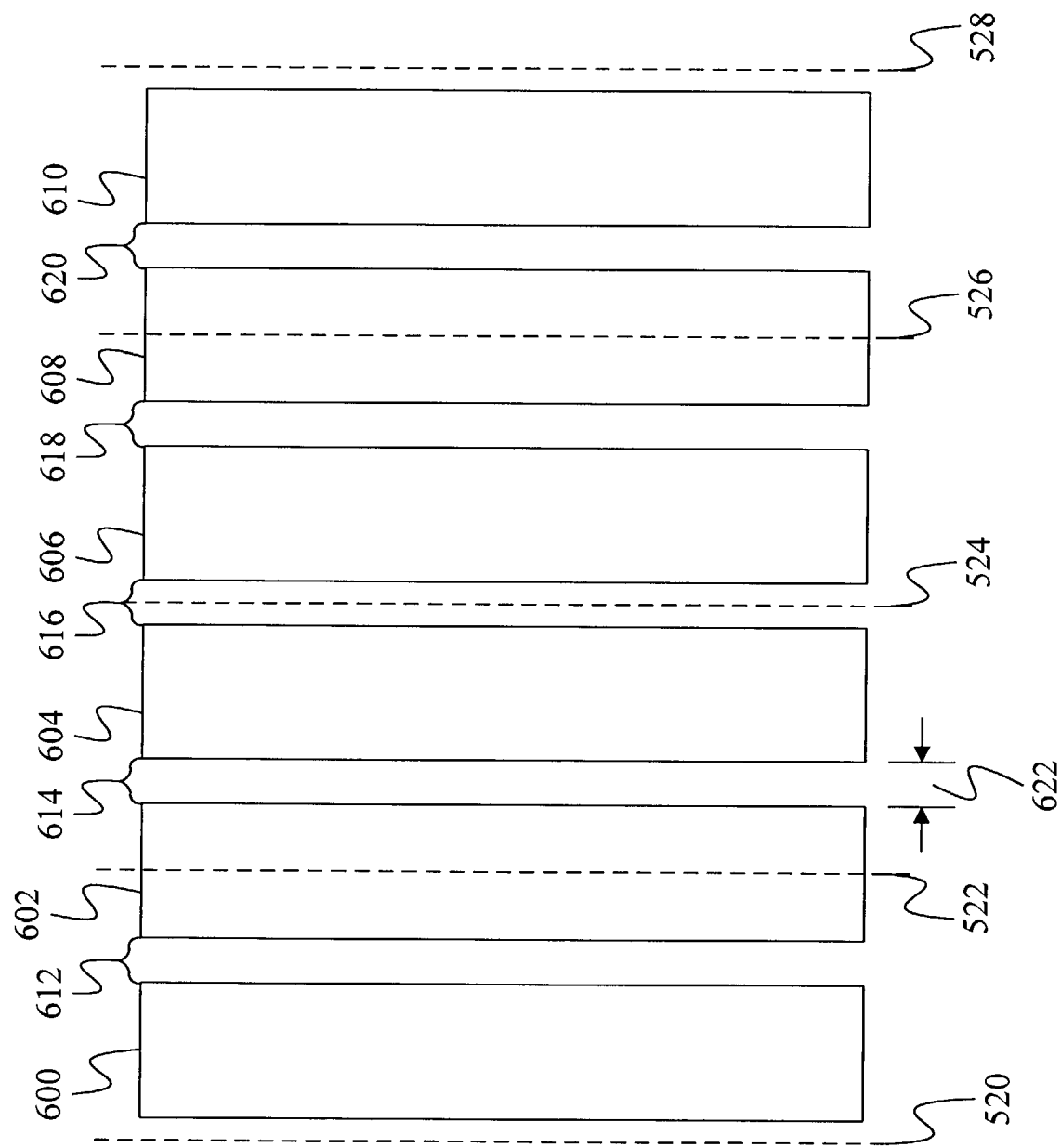
FIG. 6 is a diagram showing a track layout after adjustment of the TPI and data transfer rates under embodiments of the present invention.

FIG. 6 shows an example of a track layout under the present invention after the TPI for the head of FIG. 5 has been increased. In FIG. 6, tracks 600, 602, 604, 606, 608, and 610 are the same width as tracks 500, 502, 504, and 506, but the width 622 of guardbands 612, 614, 616, 618, and 620 is much narrower than the width 514 of guardbands 508, 510, and 512. In fact, the width 622 of the guardbands is equal to the nominal width 416 of the guardbands. The reduction in the guardband widths means that more of the recording surface is available for recording. Under the present invention, this increase in the available recording surface for a head and zone is used to reduce the data transfer rate for that head and zone and thus obtain better signal-to-noise performance for the head.

Note that the reason that many heads were discarded under the prior art was because they were too narrow to form a satisfactory signal-to-noise ratio at the nominal BPI. The present invention takes advantage of the fact that these heads are narrower than nominal to increase the TPI and thus allow for a reduced BPI for the head. Thus, the aspect of the head that would have otherwise caused it to be scrapped is utilized under the present invention to allow the head to be placed in a drive. Also note that the deficiency of one head under the present invention does not mean that the TPI or BPI of other heads must be adjusted. Instead, the present invention maintains the storage capacity of each head and zone at a constant so that the reduction in BPI for one head does not force an increase in TPI or BPI for another head. Instead, the reduction in BPI for a head is entirely made possible by the increase in TPI for the same head. This reduces the complexity of adjusting BPI and TPI for the heads since the total capacity of the drive does not have to be tracked.

Figure 7:
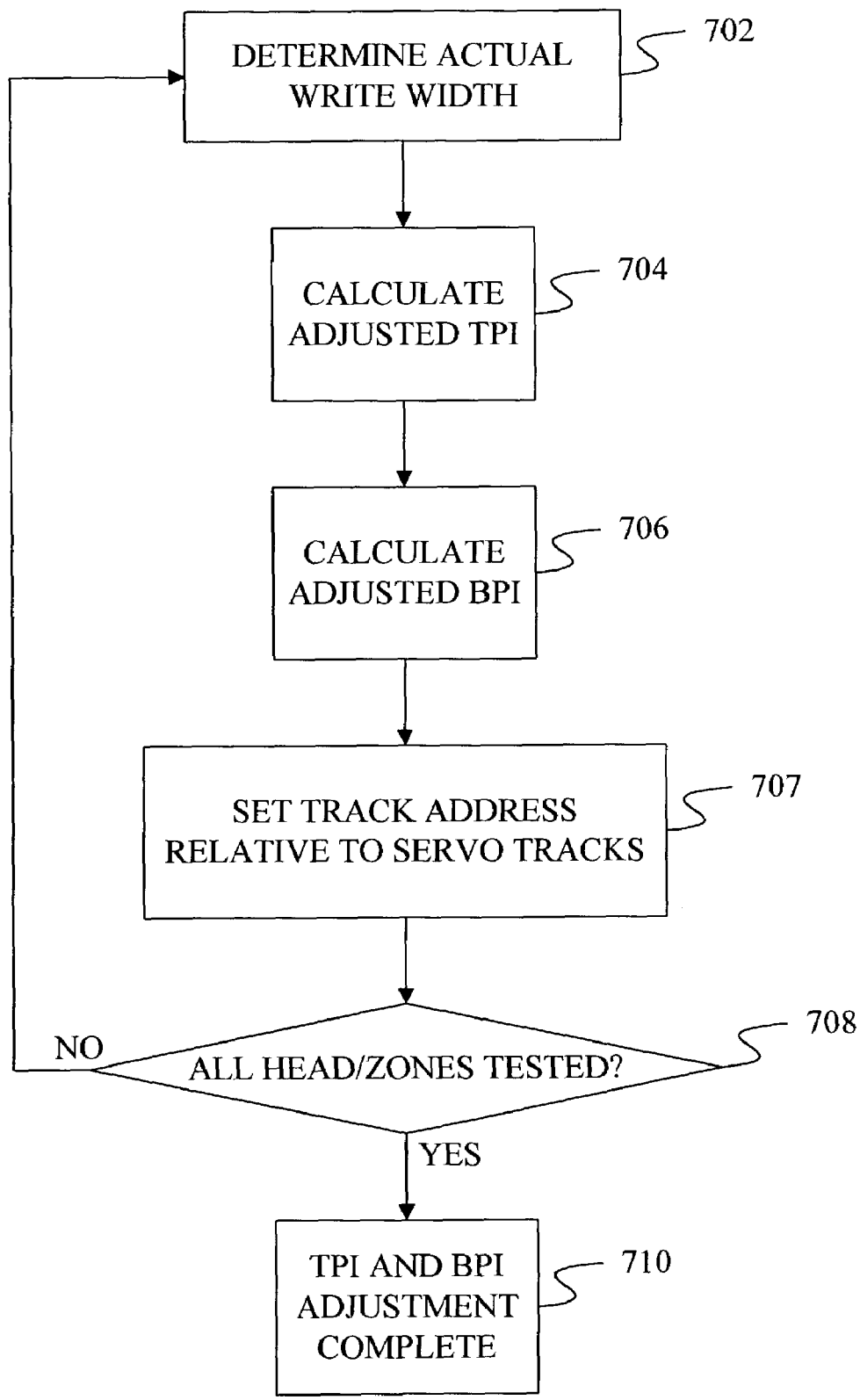
FIG. 7 is a flow diagram of a method embodying aspects of the present invention.

FIG. 7 is a flow diagram of a method embodying aspects of the present invention. At step 702 of FIG. 7, the write width of a selected transducer head is determined. This can be done by writing a track on the disc surface and then determining the width of the written track by stepping a read head across the recorded track. Initially, the read head is positioned so that it is not reading any part of the track. The head is then moved radially until the read signal begins to increase. This marks one edge of the track. The head is moved further until the read signal begins to decrease, this marks the other edge of the track. The servo positions of the read head during these two events are then used to determine the write width of the transducer.

Once the writer width has been determined at step 702, the maximum usable TPI for this head and zone is calculated at step 704. This is calculated as the inverse of the sum of the writer width and the nominal guardband size. Based on the calculated TPI from step 704, the data transfer rate, which is linearly proportionate to BPI, is calculated at step 706 to keep a constant bit capacity for the zone. In particular, the data rate can be approximately determined as:

$$DTR_V = DTR_N \frac{TPI_N}{TPI_V}$$

Where:
$DTR_V$ is the adjusted data transfer rate;
$DTR_N$ is the nominal data transfer rate;
$TPI_N$ is the nominal TPI;
$TPI_V$ is the optimized TPI determined in step 704.

In actual implementations, the data rate will be further adjusted to maintain the desired capacity. This in some cases can be slightly different from $DTR_V$ as changes in data transfer rate do not linearly translate to changes in capacity.

Once the TPI and BPI have been set for this head and zone, a virtual track table (jog table) is constructed to indicate the servo positions of the tracks under the new TPI at step 707. As can be seen in FIGS. 5 and 6, the servo track boundaries 520, 522, 524, 526, and 528 remain constant after the change in TPI. Thus, the servo tracks remain at the same track pitch and thus have the same width before and after the changes to the TPI. As a result, after the TPI has been changed, a table is needed that will convert a desired track address into a servo track position that marks the actual location of the track. This servo track position will consist of a servo track number and some offset value that indicates the position of the center of the desired track within the identified servo track. For example, after the TPI is adjusted, the fourth data track, track 606 is located in the third servo track, servo track 630, at an offset that positions the center of track 606 to the left of the center of servo track 630. Thus, the servo position of the track center for each of the tracks in FIG. 6 must be stored in a jog table so that the head can be properly positioned for any desired track. Alternatively, a computation can be performed when positioning the head to determine the position of a desired track based on the servo pitch and the adjusted TPI.

At step 708, the process determines if there are additional head/zone combinations to be tested. If there are, the process is repeated for the next head/zone combination by returning to step 702. Once all the head/zone combinations have been optimized, the process ends at block 710.

Figure 8:
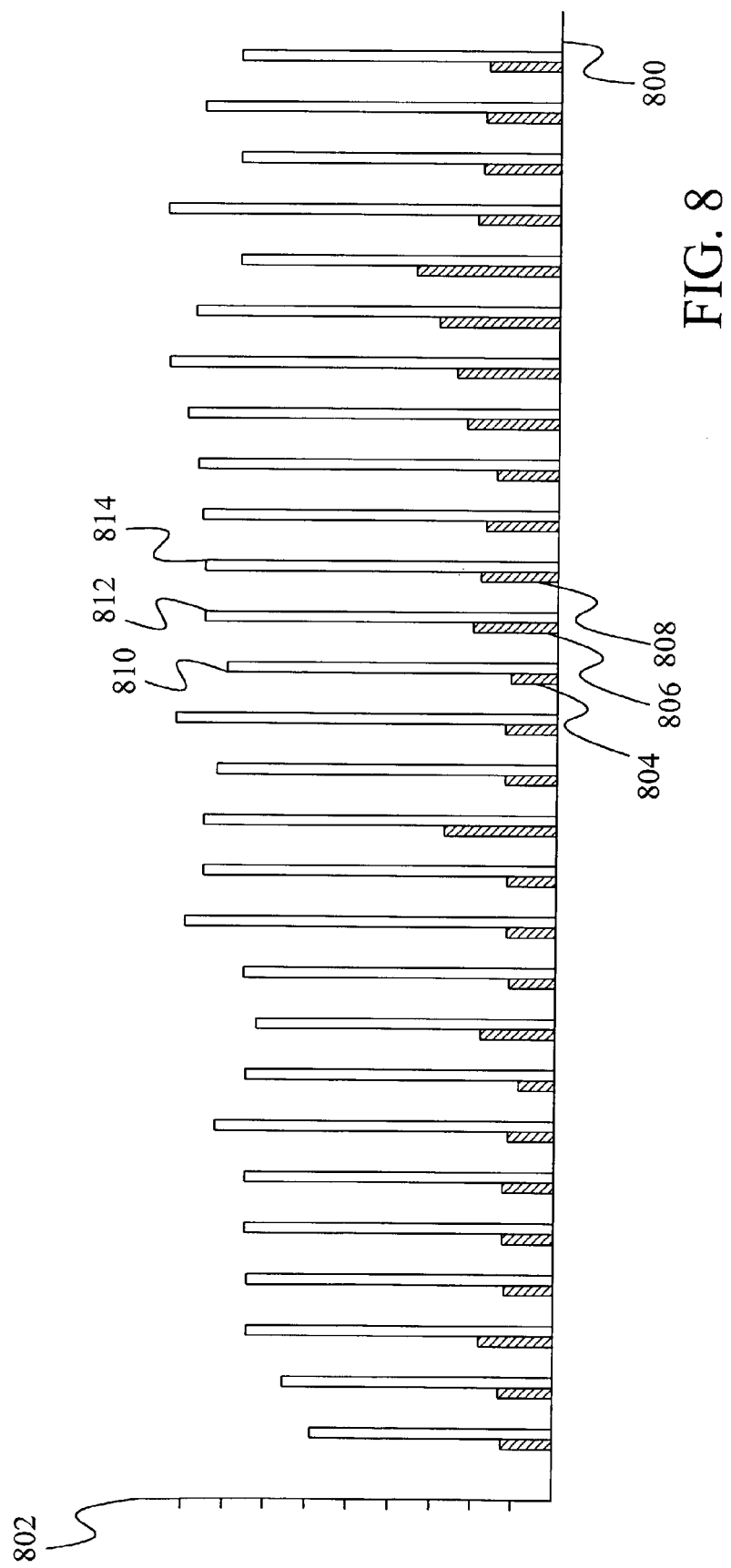
FIG. 8 is a graph showing the results of OTC testing for a head configured under the present invention versus a head configured under the prior art.

FIG. 8 is a graph showing a comparison of the results of track width testing using fixed nominal TPI and BPI of the prior art and variable TPI and BPI of the present invention. Selected cylinders are shown along horizontal axis 800 while the radial distance that the head can be moved off track before encountering a $10^{-7}$ error rate is shown along vertical axis 802.

First, an Off Track Capability (OTC) test was run on a current production disc drive using fixed nominal TPI and BPI for the head. This produced a set of off track capability values, (shown with the hatching) such as values 804, 806 and 808. Then the write width at Cylinder 25000, at approximately zero skew, was measured. The measured width was 80.95% of nominal track width, which was rounded up to 81%.

The nominal TPI for the disc drive was 64,000 TPI giving a track pitch of 15.625 micro-inches. The goal was to reduce the track pitch to 95% of nominal to provide a track pitch of 13.322 micro-inches, resulting in a TPI of 75,062. To maintain a constant areal density, the data transfer rate and therefore the BPI of each zone for the head were decreased by 81/95.

The drive was re-optimized with the reduced BPI for each zone, and OTC was measured resulting in a set of values (shown with no hatching) such as values 810, 812 and 814. Note that the OTC values increased at all cylinders due to improved signal-to-noise performance under the present invention. Note that the head had little or no margin before implementing variable TPI and exhibited good margin after implementation.

In summary, a method of designating tracks 600 and data rates in a disc drive 100 having at least one transducer head 110 is provided. The transducer head 110 has a nominal tracks per inch value, a nominal bits per inch value for any given track and a nominal capacity. The method includes determining the write width 516 for the transducer head 110 and setting an adjusted tracks per inch value for the transducer head 110 based on the write width 516. An adjusted data transfer rate, which in turn determines bits per inch value, is then set for the transducer head 110 based on the adjusted tracks per inch value and the nominal capacity such that the adjusted bits per inch value and the adjusted tracks per inch value provide the nominal capacity for the transducer head 110.

In addition, a data storage device 100 is provided for storing and retrieving data having a plurality of head/zone combinations 200, 202, 204, 206, with at least one head/zone combination having a nominal tracks per inch value, a nominal bits per inch value for any given track and a nominal capacity. The head/zone combination has an actual tracks per inch value that is larger than the nominal tracks per inch value and an actual bits per inch value that is less than the actual bits per inch value such that the combination of the actual tracks per inch value and the actual bits per inch value provides a capacity equal to the nominal capacity.

A further aspect of the invention provides a method of adjusting tracks per inch values and bits per inch values by determining a width 516 of a head 110. The width 516 is used to adjust a tracks per inch value for the head 110. The adjusted tracks per inch value is used to adjust a bits per inch value for the head 110 such that a capacity for the head 110 is unchanged after adjusting the tracks per inch value and the bits per inch value.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the memory storage system while maintaining substantially the same functionality without departing from the scope and spirit of the present invention. In addition, although the preferred embodiment described herein is directed to a memory storage system for a magnetic disc drive, it will be appreciated by those skilled in the art that the teachings of the present invention can be applied to optical drive, without departing from the scope and spirit of the present invention.

What is claimed is:

1. A method of designating tracks and data rates in a data storage device having at least one transducer head having a nominal tracks per inch value, a nominal data transfer rate, and a nominal capacity, the method comprising:
   determining a write width for the transducer head;
   setting an adjusted tracks per inch value for the transducer head based on the write width wherein the adjusted tracks per inch value is larger than the nominal tracks per inch value;
   setting an adjusted data transfer rate for the transducer head based on the adjusted tracks per inch value and the nominal capacity such that the adjusted data transfer rate and the adjusted tracks per inch value provide the nominal capacity for the transducer head wherein the adjusted data transfer rate is smaller than the nominal data transfer rate.

2. The method of claim 1 wherein the nominal capacity is the capacity of a zone on a storage medium.

3. The method of claim 1 wherein there is a servo track width associated with the head and wherein the servo track width is not adjusted when the adjusted tracks per inch value is set.

4. The method of claim 1 further comprising generating a jog table that defines a servo position for each of the designated tracks.

5. A data storage device for storing and retrieving data having a plurality of head/zone combinations with at least one head/zone combination comprising:
   a nominal tracks per inch value;
   a nominal data transfer rate;
   a nominal capacity;
   an actual tracks per inch value that is larger than the nominal tracks per inch value; and
   an actual data transfer rate that is smaller than the nominal data transfer rate such that the combination of the actual tracks per inch value and the actual data transfer rate provides a capacity that is equal to the nominal capacity for the zone.

6. The data storage device of claim 5 wherein each of the plurality of head/zone combinations has a same servo track width.

7. The data storage device of claim 6 further comprising a table for determining a servo position of a track.

8. A data storage device for storing data on a medium, the data storage device comprising:
- a transducer head having a width and capable of writing data in tracks;
- transfer rate and track adjustment means for adjusting a tracks per inch value to produce an adjusted tracks per inch value based on the width of the transducer head and for reducing a data transfer rate to produce an adjusted data transfer rate such that the combination of the adjusted tracks per inch value and the adjusted data rate creates a data capacity equal to a nominal data capacity for the transducer head.

9. The data storage device of claim 8 wherein the nominal data capacity is the nominal data capacity associated with a zone on the medium.

10. A method of designating tracks and data rates in a data storage device having at least one transducer head having a nominal tracks per inch value, a nominal data transfer rate, and a nominal capacity, the method comprising:
- determining a write width for the transducer head;
- setting an adjusted tracks per inch value for the transducer head based on the write width;
- setting an adjusted data transfer rate for the transducer head based on the adjusted tracks per inch value and the nominal capacity such that the adjusted data transfer rate and the adjusted tracks per inch value provide the nominal capacity for the transducer head; and
- generating a jog table that defines a servo position for each of the designated tracks.

* * * * *